Dec. 25, 1934.  B. GÁSPÁR  1,985,344
METHOD OF PRODUCING MULTICOLOR PHOTOGRAPHS AND CINEMATOGRAPH PICTURES
Filed July 15, 1932
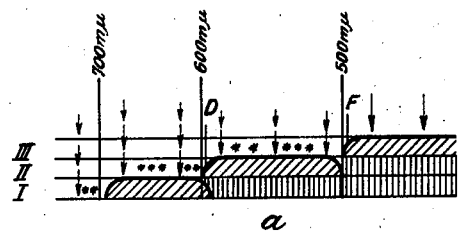
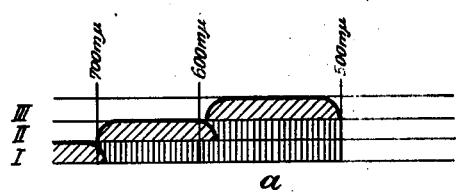
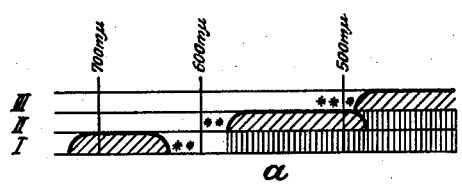
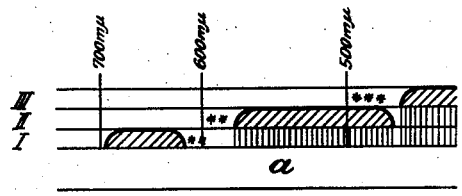
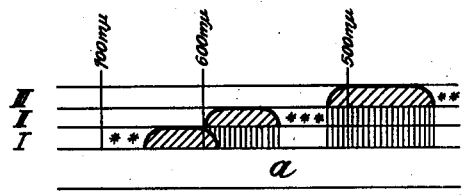
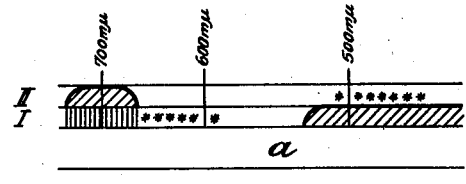
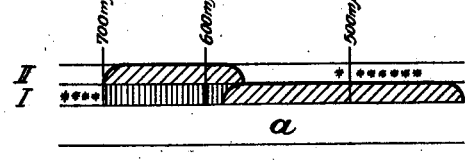
B. Gaspar
INVENTOR
By: Marks & Clerk
Att'ys.

Patented Dec. 25, 1934

1,985,344

UNITED STATES PATENT OFFICE 1,985,344

METHOD OF PRODUCING MULTICOLOR PHOTOGRAPHS AND CINEMATOGRAPH PICTURES

Béla Gáspár, Berlin, Germany

Application July 15, 1932, Serial No. 622,812
In Germany July 20, 1931

29 Claims. (Cl. 95—2)

This invention relates to a method of producing multi-color photographs and cinematograph pictures.

Various processes have already been described for producing multi-color photographs, and more particularly for producing cinematograph pictures, which employ as a basis a plurality of superimposed layers of different color-sensitiveness. Certain of these methods call for subsequent coloring of these colorless part images situated at different depths, which in themselves are capable of being performed, but are very tedious and are not of a necessarily resultant kind. In other of the proposed methods the dye necessary for producing the image is allowed to be formed by the incorporation of colorless dye-forming substances in the layer. These methods are chiefly employed in order to introduce no light-absorbing substances into the layer. If, for example, a photographic layer has been colored an intense red, the incorporated dye—assuming the same is provided in sufficient concentration—prevents the admission of green and blue rays, these being absorbed on the surface or in the vicinity thereof. If now a layer of this kind is sensitized for red rays, it is possible to obtain therein a photographic image. Naturally only the red rays are engaged in the formation of the image.

When employing the means hitherto known it was not possible, on account of the natural absorption of the dyes, to produce multi-color images on a plurality of superimposed, intensely colored photographic halogen silver layers sensitive to different rays of light.

If, for example, an intensely blue-green colored layer were poured on to an intensely red colored layer, this would appear almost black when held against the light, and in the case of a plate thus exposed the red rays would be able to penetrate only as far as the blue layer and would be absorbed on the surface of the intensely blue colored layer.

Although methods are known which enable a silver-colloid image colored throughout in the layer to be converted into a dye image, these reactions could not be applied in a practical way to multi-layer light-sensitive materials colored throughout on account of the disturbing absorption above described.

The present invention avoids these difficulties by special measures, and discloses the advantage of incorporating the dye in a plurality of superimposed, intimately connected layers in a predeterminable concentration and in an intensity necessary for producing the image.

According to the invention, it is possible to produce on colored multi-layer material copies for color-photographic and cinematographic purposes, and also to produce master images, i. e., so-called master negatives (and positives) for photographic and cinematographic purposes by means of direct exposure or reproduction by copying from multi-color transparent images produced in desired fashion. The superimposed colored layers are, according to the invention, sensitized for rays of light for which the tinged layers, or the layers situated thereover, are practically colorless.

In the arrangement, therefore, according to the invention, consideration is paid not only to the absorption or translucency of the part layer, but also to the absorption of the colored layers situated thereover.

According to the invention, the following arrangement is employed as a typical form of embodiment for producing a three-color picture or cinematograph film.

Three halogen silver layers are poured one upon the other, in the first place with blue-green, then purple-red and finally with an emulsion having a yellow color admixed therewith. The uppermost yellow-colored layer absorbs blue and allows green and red to pass. This uppermost layer is made sensitive preferably to green, for example with Pinaflavol or Erythrosin, No. 773 etc. The next layer, which is purple red and possesses a natural absorption in green, is sensitized to red, for example with Pinacyanol No. 808, Pinachrom No. 808a, Ortochrom No. 807, Ethyl-violet No. 682, etc. As regards the undermost layer, which is colored intense blue-green, and possesses a natural absorption in red, there remains only the translucency in infra-red, i. e., from approximately 680 m$\mu$ upwards, and this layer is made sensitive to the infra-red part of the spectrum with an infra-red sensitizer, for example Kryptocyanin, Neocyanin or Rubrocyanin. As shown by spectroscopical examination, the majority of blue and green dyes permit of the passage of infra-red, and possess a sharp absorption limit of approximately 680 m$\mu$ upwards. By utilizing these spectroscopical properties of the dyes and employing suitable sensitizers, it is rendered possible by the present invention to divide a plurality of superimposed, intensely colored layers into three selectively sensitive regions.

The intensely colored photographic layers act in this arrangement partly on behalf of the own part layer as protective filter, and partly on behalf of the part layer situated thereunder as selection filter. In the above example the yellow dye in the uppermost layer acts as protective filter for blue rays for all part layers. The middle layer receives only green and red rays, and is protected against the action of the green rays by its own intensive coloring in purple red. This also protects the third and undermost layer against the action of the green rays. Accordingly, only the infra-red rays remain effective in the case of the blue layer.

The production of a colored picture takes place in accordance with the invention as follows:

Three part pictures are taken according to any desired method. These three part pictures are copied consecutively or simultaneously according to a desired additive or subtractive method on to the copying material described in the above. Each of these three part pictures, whether in the form of a negative or a positive, requires to act only on the corresponding part layer which reproduces the corresponding color. For example, the red filter extract must act on the blue colored layer, which, for example, in the above case, is sensitive to infra-red, the green filter extract on the red-sensitive, purple-red colored layer, and the blue filter extract on the green-sensitive yellow colored layer. This may be accomplished either in accordance with another process by successive copying with corresponding light filters (in connection with the above example the red filter extract is copied with a filter allowing the passage of infra-red, the green filter extract with a filter allowing the passage of orange, and the blue filter extract with a filter allowing the passage of green) or by a method described in the following.

In the case of the above example the entire sensitiveness of the layers is displaced on each occasion according to the long-wave portion of the spectrum. As an additional and most convenient form of embodiment for producing master images the procedure according to the invention is as follows:

Colored master negatives or positives are produced (master positives in those cases in which for the positive process there is peformed a chemical treatment of the copying material leading to a reversal of the image). From the red filter extract there is produced a part image in a color which absorbs the infra-red—for example, with Naphthol green—and in weak concentration allows the passage of the orange-colored rays, or more precisely the rays of approximately 650 m$\mu$ downwards. For the green filter extract there is produced a blue-colored image, which absorbs the red rays of approximately 650–580 m$\mu$, and for the yellow filter extract there is produced a purple-red part image, which absorbs between approximately 500 and 600. m$\mu$. As disclosed by comparison of the absorption zones of these part images, each part image allows fully the passage of the rays pertaining to the remaining part images. These part images are either copied singly in contact with the use of filters or monochromatic light, as described above, or are united to form colored master images, i. e., a so-called master negative or positive.

The part images united to form a master negative or positive are copied with white light, and for the purpose of influencing the color nuances may possibly also be copied with the assistance of a correction filter, which generally speaking will be colored merely very weakly. The production of the single part images of the master image may be performed according to any desired method. Colored pictures may be produced, for example through the medium of gelatine reliefs on the basis of a silver image; furthermore in direct fashion according to the chromate process or according to any mordanting or tanning process, or according to the same method as the copies to be produced simultaneously on colored multi-layer material, as employed in the process according to the invention also for the production of copies, described more fully in the following. The exposure itself may also be made on a plurality of superimposed colorless layers sensitive to different colors, which layers are colored subsequently according to known processes, or have dye-forming substances incorporated therein.

The production of a master negative or positive, i. e., a colored master image has the appreciable advantage (which is particularly effective in the production of cinematograph images) that it is merely necessary to unite part images on one occasion, and it is then possible to produce an unlimited number of copies by contact or in optical fashion on the multi-layer materials herein-described, in contradistinction to the known processes, in which several part images require to be combined or copied repeatedly one over the other in connection with each copy.

For producing multi-color pictures the developed silver images are converted into a color image by destroying the dye at the point of the silver image, or vice versa at the point free of silver by reactions, in the manner which I have described in previous patents. However, any other desired method may be employed for producing dye images, for example according to Luther and von Holleben, or by tanning with subsequent dissolution of the dye at the untanned portions, or by mordanting, etc.

According to the invention, the principle on which the new method is based may also be made use of in other form. For example—the sequence of the colored layers may be altered. This is described more fully in the following.

It is also possible, departing from the usual three-divisioning of the spectrum in connection with three-color selection processes, to produce three differently colored part layers, proceeding roughly from the D and F lines, by selecting the color sensitiveness of the part layers in different fashion to that heretofore usual in the case of tripacks. The part layers have hitherto been sensitive for each one-third of the spectrum, i. e., for a main zone of the spectrum, to red, green and blue. The object of providing different-colored, correspondingly sensitized part-layers according to the invention is to obtain three selectively sensitive layers for the reproduction of three part images in the broadest meaning, i. e., the three part-layers are required not to take over at the same time the part of the selection filters. Or in other words, the three part layers serve in a particular instance for the reproduction of three color extracts, which in themselves are colorless or colored, or in any case are so selected that the same are effective only on one layer. For this selection it is sufficient if the layers on each occasion are sensitized for a part of a primary color, i. e., one spectral-third. In this case, for three-color reproduction, the color sensitiveness of the third color is eliminated. For example, as stated in the first example, the spectral region, which is regarded as red, has two part layers assigned thereto, the one sensitive merely for red up to approximately 680 m$\mu$ and one sensitive only as regards infra-red, of 680–800 mμ, and also a green-sensitive layer of approximately 500–600 mμ. In this case no use has been made of the blue sensitiveness. The procedure may also be such that two part-layers are assigned to the green spectral zone, each of which layers is sensitive as regards the blue green and the yellowish green part of the spectrum; for example, a yellowish green sensitiveness is imparted to the one layer by the use of a corresponding sensitizer, such as Erythrosin or Chinolined No. 805, and a blue-green sensitiveness is imparted to the other layer by the use of a suitable sensitizing dye, such as Acridinorange No. 788, which as well known sensitizes only up to approximately 550 mμ. The third layer may be either a blue-sensitive layer with omission of the red-sensitive layer, or vice versa a red-sensitive layer may be employed and the blue layer omitted.

For producing colored exposures and copies, in which each layer is sensitized in respect of one of the three primary regions of the spectrum usual for three-color selection purposes, and according to the invention is so tinged that within the corresponding spectral region a pervious gap remains in the absorption band of the dye, correspondingly similarly colored and sensitized layers are employed for copying purposes, which differ in the tinge from the material employed for the exposure by the fact that the absorption gaps remain open within the same region of the spectrum but at a different point. In the copying process this difference is compensated by either employing a copying filter (or corresponding monochromatic light), which closes the absorption gaps of the dyes in the master images, or by employing as exposure and copying material those dyes which mutually fill out the absorption gaps. There is employed, for example, for the production of the master image a purple red dye which is pervious between 600 and 560 mμ, for example Chloraminred 7 Bl. In the corresponding green-sensitive layer of the copying material a layer also requires to contain a red-violet dye, for example Siriusviolet B L (the appearance of the two colors to the eye is very similar), which, however, is pervious between 500 and 530 mμ. Naturally the sensitizing of the layers also depends on the following: In the first case sensitizing is performed with Erythrosin No. 773, in the second with Acridinorange No. 788. Similar arrangements may also be made in the blue or red part of the spectrum. For example—a yellow dye, say Mordant yellow G, which is pervious only up to 475 mμ, and in the copying material a yellow dye, which is pervious in ultra-violet, are employed, or for exposure a blue dye is taken, which only absorbs above 650 mμ, for example Naphtol green No. 5, and in copying material a dye, for example Diamin sky blue FF No: 518, which is pervious above 660 mμ. In the first case sensitizing is performed, for example, with Pinacyanol No. 803, in the second with Kryptocyanin No. 810.

In the above example it is not necessary to select the colors of the part images of the master image independent on the color of the selection filter, as described in connection with certain examples according to the new method. The colors of the layers may have the color of the selection filter, or a color complementary thereto. The method last referred to is accordingly also particularly suitable for the production of master images and exposures according to colored originals. The present invention also permits of the production of copies in optical fashion or by contact on either side of the film.

It has been necessary heretofore for the production of two-color films to pour suitable copying materials on to both sides separated by a dye layer absorbing the actinic light. In the present invention a separating layer is superfluous, as the intensely colored layers are protected by the filtering action of the incorporated dye against the radiation of light in a color varying from the natural color. In this there is a considerable advantage as regards the layers produced according to the invention, consisting in the fact that these in combination with the special sensitizing and intense coloring are made at the same time to constitute protective filters and selection filters, and generally speaking it is not necessary to also employ special filter dyes which do not participate in the production of the picture, although this measure is quite within the range of possibility. There is employed, for example, for producing color pictures a yellow readily allowing the passage of blue, absorbing, for example, only up to 480 mμ.

In this case a yellow dye, which is capable of being readily washed out, and which absorbs up to 500 mμ, is added as a guard therefor or for the layer situated below. Similar additions of dyes, which supplement the absorbing properties of the remaining layers, may be employed in the remaining layers. This dye, however, must not participate afterwards in the production of the colored picture.

The coloring of the master image may be varied as desired, either dependent on the color of the article being taken or complementary thereto, also with permuted black-and-white values, as described in the "Photographische Rundschau und Zentralblatt", 25th. year, pages 1–4; or more preferably the colors of the single part-images of the master image are, in accordance with the invention, selected independently of the color of the object being taken. This depends only on the sensitiveness or spectral perviousness of the tinged multi-color layers employed for their reproduction or the copying thereof respectively. In this manner two or three color images may be obtained.

It is desired, for example to make a two-color exposure on multi-layer materials of the kind described in this process, colored and sensitive to different colors. For a two-color picture reproduction of the blue-green and red values is required. For example, the first layer should be sensitive to blue and contain a dye which is pervious to blue and red rays, for example Naphtol green in corresponding dilution. The second layer is sensitive to red and yellow rays and contains a yellow dye, such as Metanil yellow No. 138.

After the conversion of the tinged silver image into a dye image the blue image is reproduced by a light green and the red by a yellow image. The master image thus obtained is copied on to layers, which reveal in the upper layer a blue-tinged and blue-sensitive, i. e., unsensitized layer, while the under layer discloses a red-colored layer sensitized for infra-red. The image colored by Naphtol green will in this case allow all blue rays to pass, and will retain only the infra-red rays, in proportion or inverse proportion to the density of the silver deposit dependent on the fact as to whether a positive image is obtained from a negative or according to the reversing process, and will act accordingly on the infra-red layer. The image colored with Metanil yellow No. 138 will allow all infra-red rays to pass, absorb only blue and blue-green rays, and act on the upper blue-colored layer.

After conversion of the silver image into a color image by known measures which are also referred to at another point of this specification a two-color image is obtained in blue-green and red, which reproduces the corresponding color values in perfectly natural form. Naturally it is also possible in similar manner by using the described correspondingly colored layers, which are sensitized and of different color perviousness, to obtain a three-color image. In place of two or three different color sensitive layers poured one over the other it is possible to employ for exposure purposes two films having the light-sensitive layers situated one against the other on the lines of the known Bipack process, or to employ a similar arrangement, one of these films with a simple layer being replaced by a film having two layers sensitive to different colors and possibly also colored. On the other hand it is also possible to tinge these superimposed layers subsequently with those colors which are adapted to the sensitiveness of the colored halogen silver emulsions employed for copying purposes.

In the following there are quoted various arrangements of differently tinged layers and corresponding sensitizers for carrying the method into effect. These are to be regarded as examples and principal forms of embodiment without, however, limiting the invention. This permits of numerous variations. It is not possible to include all of the variations in the specification.

In carrying the process into effect the following arrangements set forth in the following tables are employed:

|   | Natural color of the layer | | | Sensitizing of the layer | | |
|---|---|---|---|---|---|---|
|   | I layer | II layer | III layer | I layer | II layer | III layer |
| 1 | Purple-red | Yellow | Blue-green | Blue | Red | Infra-red |
| 2 | Blue-green | Yellow | Purple-red | Blue | Green | Infra-red |
| 3 | Yellow (absorption up to about 480 mμ) | Purple-red (absorption about 595–480 mμ) | Blue (absorption about 630–750 mμ 620–680 mμ) | Blue | Yellowish-green | Red or infra-red |
| 4 | Blue-green | Red | | Blue | Infra-red | |
| 5 | Yellow-orange | Blue-green | | Red | Infra-red | |
| 6 | Yellow-orange | Blue-green | | Red | Blue | |
| 7 | Blue-green | Yellow-orange | | Blue | Red | |

Color of the part image in master negative or positive

| | Blue filter extract for first layer | Green filter extract for second layer | Red-filter extract for third layer |
|---|---|---|---|
| 1 | Blue | Yellow | Green (absorbing infra-red) |
| 2 | Purple-red | Green (absorbing infra-red) | Yellow |
| 3 | Yellow | Purple-red | Blue or green (absorbing infra-red) |

| | Blue-green filter extract | Orange filter extract |
|---|---|---|
| 4 | Yellow | Green (absorbing infra-red) |
| 5 | Blue | Green (absorbing infra-red) |

Color or perviousness of the filter for copying black-and-white part negatives or positives

| | Blue filter extract | Green filter extract | Red filter extract |
|---|---|---|---|
| 1 | Red | Blue | Infra-red |
| 2 | Green | Infra-red | Blue |
| 3 | Blue | Yellowish green | Red or infra-red |

| | Blue-green filter extract | Red-orange filter extract |
|---|---|---|
| 4 | Infra-red | Blue-green |
| 5 | Red | Infra-red |

In copying the halogen silver layers poured one upon the other and colored the procedure may also be such that the exposition takes place on both sides of the film, for example the forms of embodiment Nos. 6 and 7 of the above table. In this connection the corresponding protective filter effect and sensitizing of the layers is just the same as when copying on one side of the film. For this purpose the copy apparatus may be employed which was used for the exposure of the film coated on both sides. Ordinary black-and-white part images may be employed, and copied with white light. There may also be used ordinary black-and-white part images as master image. The white light acts in this case only on one layer, as the tinges of the layers act as protective filters.

Fig. 1 shows a three-layer material, the layers of which are colored yellow, purple and blue, i. e., a sequence for a normal color image.

The material shown in Fig. 2 serves as a colored master image from which the proper image is prepared on the material according to Fig. 1. The two accordingly belong together.

Figures 3 to 5 show other possible types of material for carrying out the multi-color photographic process according to the invention.

Figures 6 and 7 on the other hand show materials adapted for two-color work, Figure 6 showing the master image and Figure 7 the final copy.

The construction and the operation of the layers is illustrated diagrammatically in the drawing, wherein Fig. 1 shows a section through a light-sensitive material, in which three differently colored layers (I, II and III) are poured on to the supports $a$. The layer I is in direct contact with the support. On the entire cross-section of the layer there is projected a spectrum, which commences in the drawing on the left at the infra-red rays and extends over the entire visible spectrum. The vertical lines, which cut all the layers, show, as already disclosed by the legends, the wave lengths, for example 700 m$\mu$. D and F are the D and F lines of the spectrum, whereby the former indicates the line of separation between the red and the green spectral zones, and the second the separating line between the green and blue spectral zones. The obliquely shaded areas indicate the absorption curves of the dye coloring the layer; the vertically shaded parts of the surfaces represent the imperviousness or the absorptions of the upper layers. These vertically shaded absorptions indicate that by the light, which penetrates from the surface of the layer 3 in the direction of the layer I (as indicated by the parallel arrows), a part of the spectrum of the higher layers is absorbed. As indicated diagrammatically, the imperviousness of the higher layers is, therefore, also effective as regards certain spectral zones for the underneath layers. The asterisks in the drawing indicate the point of the spectrum in respect of which the particular layer is sensitive.

Fig. 1. In the layer I the absorption curve (shaded obliquely) indicates a blue dye, i. e., this absorbs between 600 and 700 mμ.

In layer II there is indicated a purple-red dye absorbing between 600 and 500 mμ, and a yellow dye absorbing below 500 mμ. The small asterisks indicate the spectral zones for which the layer is sensitive or has been sensitized.

Layer I is sensitized for infra-red of approximately 680 mμ upwards.

Layer II is sensitized for visible red.

Layer III is sensitized for green.

In Fig. 2 there are indicated the absorption curves or perviousness of the layers which are employed as master image for the light-sensitive material according to Fig. 1, and it is to be seen that the single layers of the master image contain colored part pictures, which perform absorption in the colors corresponding to the sensitiveness of the single part layers in Fig. 1. The colors in the part layers I, II and III perform absorption in the zone of sensitiveness of the part layers I, II and III of Fig. 1.

Fig. 3 shows another coloring of the layers. Each layer is sensitized on each occasion in the same one-third of the spectrum in which the dye coloring the layer performed absorption. The drawing shows that the sensitizing certainly takes place in the same spectral region, but the absorption curves or the concentration and nature of the dye are so calculated that a small absorption gap remains in the same spectral region in which the main absorption of the dye occurs. For example in Fig. 1 the main absorption takes place in the long-wave portion of the red spectral zone, while sensitizing is disposed in the short wave portion of the red spectral zone. In layer II the absorption is in the green portion; sensitizing, however, occurs in the long-wave portion of the green spectral section, in this case in the yellow part of the green spectral section.

In the layer III, which is colored yellow, the concentration of the yellow dye is so calculated that the absorption does not extend quite as far as the end of the region of the natural sensitiveness of the blue-sensitive layer III.

In Fig. 4 there is shown a similar arrangement with the difference that in the blue spectral zone the sensitizing extends still further into the blue part of the spectrum.

In Fig. 5 there is shown a copying material, which possesses absorption gaps or equivalent sensitive points at those parts for which the dyes indicated in Fig. 4 perform absorption. The sensitive point of the layer III is situated in the short-wave violet.

The material according to Fig. 5 may be employed as suitable copying material in such cases in which the material according to Fig. 4 is employed as exposure material.

Fig. 6 shows a colored exposure material for two-color films.

Layer I is sensitive to red, layer II normally to blue-green. On these layers a two-color exposure may be made, whereby each layer is sensitive for only one-half of the visible spectrum. Layer I is colored yellow. This color serves as screen dye and at the same time as dye for forming a master image, resulting in a part-image which is in a color complementary to the sensitiveness of the copying material.

The other part image which results in the layer II is completely pervious to the visible rays, and absorbs only the long-wave red. It is from this dye that the second part of the master image is formed which absorbs the infra-red part of the spectrum.

In Fig. 7 there is shown the copying material for a sensitive material for two-color pictures. The upper blue-colored layer, which performs absorption in the red and yellow portion of the spectrum, will receive the red part-image according to Fig. 6 and be sensitive to blue. The layer I is sensitive to infra-red, and contains a red-orange dye. This will react in the infra-red part of the spectrum.

It is on this part that the image acts which results in the layer II of the exposure material in Fig. 6 and is copied in infra-red light.

What I claim as new and desire to secure by Letters Patent is:

1. A method of producing multi-color photographs, cinematograph images and the like on a photographic material comprising colored silver halide layers poured one on to the other; which consists in sensitizing the single color part-layers in respect of rays which are allowed to pass by the dyestuffs employed for coloring the said layers and by the upper layers themselves, copying behind a master image on at least one side, and thereupon converting the diffusely colored part-layers into color images by discharging the dyestuff at the requisite points.

2. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a colored master image, and thereupon converting the diffusely colored part-layers into color images by discharging the dyestuff at the requisite points.

3. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a black-and-white master image, and thereupon converting the diffusely colored part-layers into color images by discharging the dyestuff at the requisite points.

4. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image, and thereupon converting the diffusely colored part-layers into color images by destroying the dyestuff at the requisite points.

5. A method of producing multi-color photographs, cinematograph images and the like on a photographic material comprising colored silver halide layers poured one on to the other and sensitive to different colors; which consists in sensitizing the single color part-layers in respect to rays which are allowed to pass by the dyestuffs employed for coloring the said layers and by the upper layers themselves, copying behind a master image, and thereupon converting the diffusely colored part-layers into color images by dissolution of the dyestuff at the requisite points.

6. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image containing colored part images in the colors complementary to the sensitiveness of the said single color part-layers, and thereupon converting the diffusely colored part-layers into color images by discharging the dyestuff at the requisite points.

7. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image, and thereupon converting the diffusely colored part-layers into color images by discharging the dyestuff at the requisite points, the copying of the single color selection pictures being performed in a contact process in chronological succession with the assistance of a filter pervious to those rays for which the part-layer colored corresponding to the color selection pictures is sensitized.

8. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image, and thereupon converting the diffusely colored part-layers into color images by discharging the dyestuff at the requisite points, the copying of the single color selection pictures being performed in a contact process simultaneously by the optical combination of a plurality of part-images, with the assistance of a filter pervious to those rays for which the part-layer colored corresponding to the color is sensitized.

9. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image containing part-images in colors complementary to the color sensitiveness of the single part-layers of the copying material and produced by copying from separate part-images on to multi-layer material, and thereupon converting the diffusely colored part-layers into color images by discharging the dyestuff at the requisite points.

10. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image produced by combining part-images in colors complementary to the color sensitiveness of the single part-layers of the copying material, and thereupon converting the diffusely colored part-layers into color images by discharging the dyestuff at the requisite points.

11. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image produced by direct exposure on correspondingly colored multi-layer material, in which each layer is sensitized in respect of one of the three primary regions of the spectrum usual in three-color selection processes, and is so tinged that a pervious gap remains in the absorption band of the dye within the corresponding spectral zone, and thereupon converting the diffusely colored part-layers into color images by discharging the dyestuff at the requisite points.

12. A method of producing multi-color photographs, cinematograph images and the like on a photographic material comprising colored silver halide layers poured one on to the other and sensitive to different colors, which consists in sensitizing the single color part-layers in respect of rays which are allowed to pass by the dyestuffs employed for coloring the said layers and by the upper layers themselves, copying behind a master image, and thereupon converting the diffusely colored part-layers into color images by discharging the dyestuff at the requisite points, the part-layers corresponding with the master image being colored with dyes which reveal absorption gaps at another point of the same spectral region, and copied, possibly with the use of filters, which close the pervious gaps in the absorption band of the master image.

13. A method of producing multi-color photographs, cinematograph images and the like on a photographic material comprising colored silver halide layers poured one on to the other and sensitive to different colors, which consists in sensitizing the single color part-layers in respect of rays which are allowed to pass by the dyestuffs employed for coloring the said layers and by the upper layers themselves, copying behind a master image, and thereupon converting the diffusely colored part-layers into color images by discharging the dyestuff at the requisite points, the part-layers corresponding with the master image being colored with dyes which close the absorption gaps of the master image.

14. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind master images produced by direct exposure on exposure material in correspondingly different colors and sensitive to different colors, wherein the color of the layer employed for exposure is independent of the color of the object being taken, and thereupon converting the diffusely colored part-layers into color images by discharging the dyestuff at the requisite points.

15. A method of producing multi-color photographs, cinematograph images and the like on a photographic material comprising colored silver halide layers poured one on to the other and sensitive to different colors; which consists in sensitizing the single color part-layers in respect of rays which are allowed to pass by the dyestuffs employed for coloring the said layers and by the upper layers themselves, copying behind a master image, and thereupon converting the diffusely colored part-layers into color images by discharging the dyestuff at the requisite points, the separation of the spectrum, in contradistinction to the usual separation into three primary zones, taking place at other points of the spectrum by preclusion of the one primary color and dividing one of the remaining spectral zones into two zones.

16. A photographic material for producing multi-color photographs, cinematograph images and the like, comprising a plurality of layers poured one upon the other and differently colored and sensitive to different colors, at least one of the superimposed colored layers being sensitized in respect of infra-red.

17. A photographic material for producing multi-color photographs, cinematograph images and the like, comprising a plurality of layers poured one upon the other, the uppermost layer being colored yellow and sensitized for green, the middle layer purple-red and sensitized for red and the undermost layer blue-green and sensitized for infra-red rays.

18. A photographic material for producing multi-color photographs, cinematograph images and the like, comprising a plurality of layers poured one upon the other, the uppermost layer being colored purple-red and sensitized for blue, the middle layer yellow and sensitized for red and the lowermost layer blue and sensitized for infra-red rays.

19. A photographic material for producing multi-color photographs, cinematograph images and the like, comprising a plurality of layers poured one upon the other, the uppermost layer being colored yellow and sensitized for blue, the middle layer purple-red and sensitized for yellowish green and the undermost layer blue-green and sensitized for infra-red rays, absorption gaps being provided between the single spectral regions.

20. A photographic material for producing multi-color photographs, cinematograph images and the like, comprising a plurality of layers poured one upon the other, the upper layer being colored blue-green and sensitized for blue, the under layer being colored orange and sensitized for infra-red rays.

21. A photographic material for producing multi-color photographs, cinematograph images and the like, comprising a plurality of layers poured one upon the other, the upper layer being colored red-orange and sensitized for red and the under layer being colored blue-green and sensitized for infra-red rays.

22. A photographic material for producing multi-color photographs, cinematograph images and the like, comprising a plurality of layers poured one upon the other, the upper layer being colored red-orange and sensitized for red and the under layer being colored blue-green and sensitized for blue rays, copying being performed on at least one side selectively by a contact process and an optical process.

23. A photographic material for producing multi-color photographs, cinematograph images and the like, comprising a plurality of layers poured one upon the other, the upper layer being colored blue-green and sensitized for blue rays and the under layer being colored red-orange and sensitized for red rays, copying being performed on at least one side selectively by a contact process and an optical process.

24. Light sensitive material, according to claim 16, in which each colored layer, in the same spectral zone in which the dyestuff employed for coloring purposes performs absorption and is sensitized and so colored, that a spectral gap remains free within the said spectral range, whereby the upper layer becomes colored yellow and sensitive to blue, the middle layer colored purple-red and sensitive to yellowish green and the undermost layer colored blue-green and sensitive to infra-red.

25. A photographic material for producing multi-color photographs, cinematograph images and the like, comprising silver-halide layers poured one upon the other, the uppermost layer being sensitive in respect of rays which are allowed to pass by the dyestuff employed for coloring the said layer, and the layers situated thereunder being sensitive in resepct of those rays which are allowed to pass by their own color and the colors of the upper layers.

26. A light-sensitive material for producing multi-color photographs, cinematograph images and the like, comprising a plurality of superimposed layers, of which at least one layer possesses a spectral gap in the same spectral range in which absorption is performed by the dyestuff employed for coloring purposes, and is sensitized for this gap, the underneath colored layers being sensitized for those rays which are allowed to pass by the upper layers.

27. A light-sensitive material for producing multi-color photographs, cinematograph images and the like, comprising a plurality of superimposed layers, of which at least one layer possesses a spectral gap in the same spectral range in which absorption is performed by the dyestuff employed for coloring purposes, the underneath layers being sensitized in respect of the said gap.

28. A photographic material for producing multi-color photographs, cinematograph images and the like, comprising a plurality of layers poured one upon the other, in which each colored layer, in the same spectral zone in which the dyestuff employed for coloring purposes performs absorption, is sensitized, and so colored that a spectral gap remains free within the said spectral range, whereby the upper layer becomes colored yellow and sensitive to blue, the middle layer colored purple-red and sensitive to yellowish green and the undermost layer colored blue-green and sensitive to infra-red.

29. A photographic material for producing multicolor photographs, cinematographic images and the like, comprising a plurality of layers poured one upon the other, the uppermost being colored blue-green and sensitized for blue, the middle layer being yellow and sensitized for green, the undermost layer being purple and sensitized for infra-red.

BÉLA GÁSPÁR.